(12) United States Patent
Bertoni Scarton et al.

(10) Patent No.: US 11,372,841 B2
(45) Date of Patent: Jun. 28, 2022

(54) ANOMALY IDENTIFICATION IN LOG FILES

(71) Applicant: International Business Machines Corporation, Armonk, NY (US)

(72) Inventors: Tiago Bertoni Scarton, Sao Paulo (BR); Dashiell Lucena Gonzaga Borges, Sao Paulo (BR); Thiago Bianchi, São Carlos (BR); Joao Souto Maior, Jaboatao dos Guararapes (BR)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 16/776,891

(22) Filed: Jan. 30, 2020

(65) Prior Publication Data
US 2021/0240691 A1    Aug. 5, 2021

(51) Int. Cl.
*G06F 16/00*     (2019.01)
*G06F 16/23*     (2019.01)
*G06Q 30/04*     (2012.01)
*G06F 40/242*    (2020.01)
*G06F 40/30*     (2020.01)
(Continued)

(52) U.S. Cl.
CPC ........ *G06F 16/2365* (2019.01); *G06F 40/205* (2020.01); *G06F 40/242* (2020.01); *G06F 40/247* (2020.01); *G06F 40/30* (2020.01); *G06Q 30/04* (2013.01)

(58) Field of Classification Search
CPC .. G06F 16/2365; G06F 40/247; G06F 40/205; G06F 40/242; G06F 40/30; G06Q 30/04
See application file for complete search history.

(56) References Cited

U.S. PATENT DOCUMENTS 8,209,567 B2 *  6/2012  Cohen ............... G06F 16/285
                                                714/39
9,183,173 B2 * 11/2015  Yih ........................ G06N 20/00
(Continued)

FOREIGN PATENT DOCUMENTS

WO        2019060327 A1    3/2019

OTHER PUBLICATIONS

Forkan et al., "A context-aware approach for long-term behavioural change detection and abnormality prediction in ambient assisted living", Pattern Recognition 48 (2015), pp. 628-641.
(Continued)

*Primary Examiner* — Leslie Wong
(74) *Attorney, Agent, or Firm* — Stosch Sabo (57) ABSTRACT

Described are techniques for identifying anomalies in log files. The techniques including a method encompassing mapping a plurality of log entries into a bag-of-words matrix and determining respective cosine similarities between consecutive log entries in the bag-of-words matrix. The method further includes converting respective cosine similarities to respective states and determining respective state transitions between consecutive log entries. The method further includes generating a stochastic matrix based on the respective state transitions and identifying an anomalous log entry based on an anomalous state transition. The anomalous state transition has a probability below a probability threshold, and the probability is based on the stochastic matrix.

20 Claims, 8 Drawing Sheets

(51) Int. Cl.
*G06F 40/205* (2020.01)
*G06F 40/247* (2020.01)

(56) References Cited

U.S. PATENT DOCUMENTS

| | | | |
|---|---|---|---|
| 9,552,249 B1* | 1/2017 | James | G06F 11/3476 |
| 2007/0300300 A1 | 12/2007 | Guo et al. | |
| 2011/0296244 A1* | 12/2011 | Fu | G06F 11/3608 |
| | | | 714/E11.029 |
| 2018/0096057 A1* | 4/2018 | Zheng | H04L 51/16 |
| 2019/0073406 A1* | 3/2019 | Xu | G06F 16/2237 |
| 2019/0114362 A1* | 4/2019 | Subbian | G06F 16/9535 |
| 2019/0260789 A1 | 8/2019 | Hagi et al. | |
| 2019/0354457 A1* | 11/2019 | Urmanov | G06F 16/353 |
| 2020/0334093 A1* | 10/2020 | Dubey | G06F 11/0778 |
| 2020/0336499 A1* | 10/2020 | Kulkarni | G06F 16/9024 |
| 2020/0382539 A1* | 12/2020 | Janakiraman | H04W 12/02 |

OTHER PUBLICATIONS

Cho et al., "Efficient anomaly detection by modeling privilege flows using hidden Markov model", Computers & Security, vol. 22, Issue 1, Jan. 2003, pp. 45-55.

Xu et al., "Detecting large-scale system problems by mining console logs", Proceedings of the ACM SIGOPS 22nd symposium on Operating systems principles, Oct. 2009, pp. 117-131.

Ivancsy et al., "Frequent Pattern Mining in Web Log Data", Acta Polytechnica Hungarica, vol. 3, No. 1, 2006, pp. 77-90.

Li et al., "An Integrated Framework on Mining Logs Files for Computing System Management", Conference Paper—Jan. 2005, pp. 776-781.

Chen et al., "Pinpoint: Problem Determination in Large, Dynamic Internet Services", Proceedings International Conference on Dependable Systems and Networks, Jun. 23-26, 2002, 10 pages.

IBM, "IBM Maximo: Essential insights for intelligent asset maintenance and operations", printed Jan. 7, 2020, 7 pages.

IBM, "Optimize real estate portfolios and improve occupant experiences with IoT and AI", Tririga, printed Jan. 7, 2020, 4 pages.

IBM, "IBM IoT Connected Vehicle Insights", printed Jan. 7, 2020, 3 pages.

IBM, "IBM and Red Hat", printed Jan. 7, 2020, 10 pages.

Porter, M.F., "Snowball: A language for stemming algorithms", Oct. 2001, 15 pages.

Sebastiani, F., "Machine Learning in Automated Text Categorization", ACM Computing Surveys, vol. 34, No. 1, Mar. 2002, pp. 1-47.

Silva et al., "The Importance of Stop Word Removal on Recall Values in Text Categorization", Proceedings of the International Joint Conference on Neural Networks, Jul. 20-24, 2003, pp. 1661-1666.

Zhang et al., "Automatic Synonym Extraction Using Word2Vec and Spectral Clustering", Proceedings of the 36th Chinese Control Conference, Jul. 26-28, 2017, pp. 5629-5632.

Ajanki, A., "Tech Pick of the Week: Log anomaly detection tools", Dec. 12, 2013, 9 pages.

N et al., "Sequence Similarity Using Gaines Hidden Markov Model for Failure Prediction", International Journal of Recent Trends in Engineering, vol. 2, No. 2, Nov. 2009, pp. 30-34.

Mell et al., "The NIST Definition of Cloud Computing", Recommendations of the National Institute of Standards and Technology, Sep. 2011, 7 pages.

* cited by examiner

```
08-09 16:57:37 INFO : cronAction end for Integration crontask JMSQSEQCONSUMER.SEQQOUT
08-09 16:57:37 INFO : cronAction start for Integration crontask JMSQSEQCONSUMER.SEQQIN
08-09 16:57:37 INFO : cronAction end for Integration crontask JMSQSEQCONSUMER.SEQQIN
08-09 16:57:38 ERROR: java.lang.NullPointerException  (psdi.server.CronTaskManager 2142)
08-09 16:57:38 INFO : system#StatementCleanupThreadTerminated end
```

FIG. 5A

| Log Entry | INFO | cronAction | end | Integration | crontask | start | JMSQSEQ/ JMSQSEQ CONSUMER SEQQOUT | JMSQSEQ/ JMSQSEQ CONSUMER SEQQIN | ERROR | NullPointerException | Statement CleanupThread Terminated end |
|---|---|---|---|---|---|---|---|---|---|---|---|
| #1 | 1 | 1 | 1 | 1 | 1 | 0 | 1 | 0 | 0 | 0 | 0 |
| #2 | 1 | 1 | 0 | 1 | 1 | 1 | 0 | 1 | 0 | 0 | 0 |
| #3 | 1 | 1 | 1 | 1 | 1 | 0 | 0 | 1 | 0 | 0 | 0 |
| #4 | 0 | 0 | 0 | 0 | 0 | 0 | 0 | 0 | 1 | 1 | 1 |
| #5 | 1 | 0 | 0 | 0 | 0 | 0 | 0 | 0 | 0 | 0 | 1 |

FIG. 5B

| Log Entry | Cos Distance |
|---|---|
| #1 | 1 |
| #2 | 0,666 |
| #3 | 0,833 |
| #4 | 0 |
| #5 | 0 |

ANOMALY IDENTIFICATION IN LOG FILES

BACKGROUND

The present disclosure relates to log file analysis, and, more specifically, to identifying anomalies in log files.

Log files collect and store some or all input operations, output operations, and/or processing operations from a computer system (or portion thereof), a computer-implemented application (or portion thereof), or another component of an electronic data processing system. Log files document information that can assist developers, users, and/or administrators in detecting and correcting errors, failures, dysfunctions, intrusions, and/or other problems that may arise from using a computer system or a computer-implemented application.

SUMMARY

Aspects of the present disclosure are directed toward a method comprising mapping a plurality of log entries into a bag-of-words matrix and determining respective cosine similarities between consecutive log entries in the bag-of-words matrix. The method further comprises converting respective cosine similarities to respective states and determining respective state transitions between consecutive log entries. The method further comprises generating a stochastic matrix based on the respective state transitions and identifying an anomalous log entry based on an anomalous state transition. The anomalous state transition can have a probability below a probability threshold, where the probability is based on the stochastic matrix.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward log file analysis, and, more specifically, to identifying anomalies in log files. While not limited to such applications, embodiments of the present disclosure may be better understood in light of the aforementioned context.

Aspects of the present disclosure are directed to improved techniques for detecting anomalies in log files. These techniques can include, for example, (i) mapping a plurality of log entries into a bag-of-words matrix, (ii) determining respective cosine similarities between consecutive log entries in the bag-of-words matrix, (iii) converting respective cosine similarities to respective states, (iv) determining respective state transitions between consecutive log entries, (v) generating a stochastic matrix based on the respective state transitions, and/or (vi) identifying an anomalous log entry based on an anomalous state transition that has a probability below a probability threshold, where the probability is based on the stochastic matrix.

These and other aspects of the preset disclosure are advantageous for numerous reasons. One example advantage relates to the bag-of-words matrix insofar as the bag-of-words matrix is an efficient technique for characterizing content from respective log entries in a log file. Another example advantage relates to the cosine similarities insofar as cosine similarities quantify similarity with respect to orientation (e.g., type of content in log entries) rather than magnitude (e.g., amount of content in log entries). Yet another example advantage relates to the stochastic matrix insofar as using the stochastic matrix provides a statistically robust technique for characterizing the probability of various state transitions as derived from the calculated cosine similarities. These and other advantages generally result in anomaly detection functionality that exhibits increased accuracy relative to other anomaly detection methods and/or decreased computational resource requirements compared to other anomaly detection methods.

In light of the improvements and advantages discussed above, various aspects of the present disclosure can be incorporated into numerous applications in order to improve the functionality, efficiency, and/or accuracy of the numerous applications by detecting anomalies in log files. Anomalous log entries can be indicative of user errors, process failures, software bugs, cyberattacks, impending hardware failures, and/or other problems. A non-exhaustive list of example applications are provided below.

As one example application, aspects of the present disclosure can be incorporated into an asset management application in order to analyze log files generated by the asset management application. One example of an asset management application is Maximo® Asset Management (a registered trademark of International Business Machines Corporation, and a product provided by the same). In an asset management application, aspects of the present disclosure can lead to improvements from an operational standpoint and/or a developmental standpoint. From an operational standpoint, aspects of the present disclosure can be used to identify potential issues while they are developing (e.g., a software malfunction, a security breach, etc.). From a developmental standpoint, aspects of the present disclosure can be used to test software usability and add, remove, or change functionalities, interfaces, processes, and the like.

As another example application, aspects of the present disclosure can be incorporated into Internet of Things (IoT) applications and/or Artificial Intelligence (AI) applications in order to analyze log files generated by the IoT applications and/or AI applications. Examples of IoT and/or AI applications include, but are not limited to, IBM Tririga® Building Insights (a registered trademark of International Business Machines Corporation, and a product provided by the same) for connecting and securely storing data and IBM IoT Connected Vehicle Insights (a product of International Business Machines Corporation) for implementing cognitive computing amongst interconnected vehicles. When used in these and similar applications, aspects of the present disclosure can be useful for supplementing cybersecurity systems such as intrusion and detection systems (e.g., detecting malicious intrusions or attacks) and/or predicting hardware failures (e.g., detecting server failures in a data center).

As yet another example application, aspects of the present disclosure can be incorporated into various cloud computing infrastructure applications such as, for example, RHEL® (a registered trademark of Red Hat, Inc., and a product provided by the same) where it can be used to read server activity log files in order to detect and/or mitigate intrusions and/or cyberattacks. As is understood by one skilled in the art, RHEL® is an acronym for Red Hat® Enterprise Linux® (a registered trademark of Linus Torvalds).

As can be seen from the various examples provided above, aspects of the present disclosure can be incorporated into a variety of applications in order to improve the development, operation, and/or security of those applications by accurately and efficiently detecting anomalies in log files.

Figure 1:
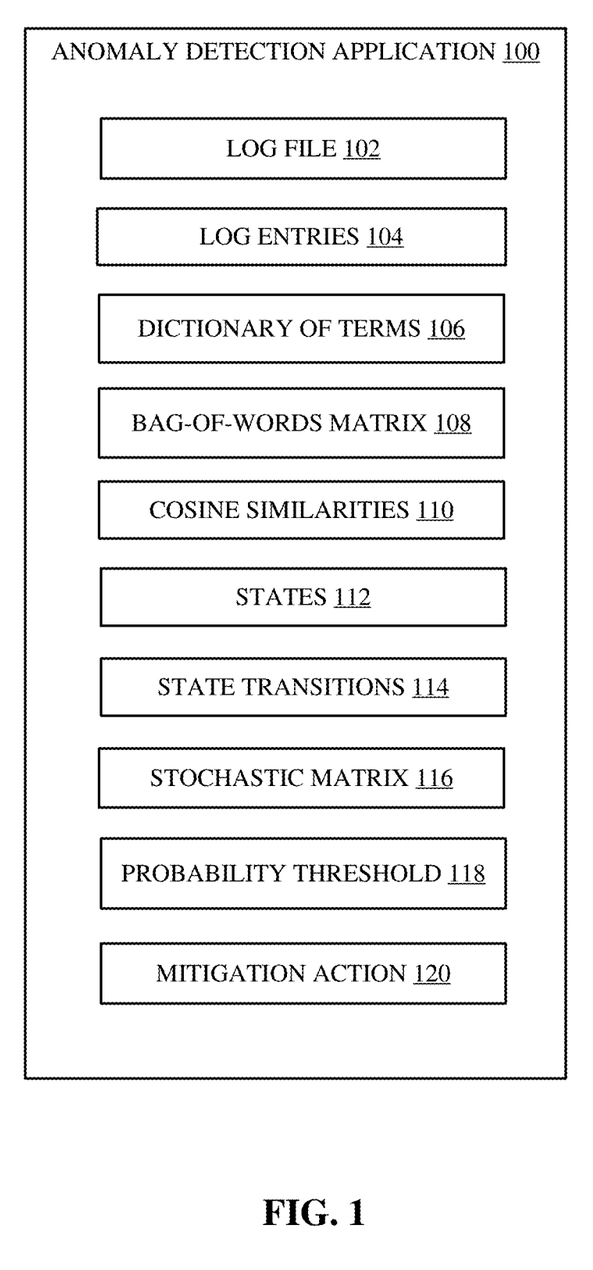
FIG. 1 illustrates a block diagram of an example anomaly detection application, in accordance with some embodiments of the present disclosure.

Referring now to the figures, FIG. 1 illustrates an example anomaly detection application 100, in accordance with some embodiments of the present disclosure. The anomaly detection application 100 includes a log file 102, a plurality of log entries 104, a dictionary of terms 106, a bag-of-words matrix 108, a plurality of cosine similarities 110, a plurality of states 112, a plurality of state transitions 114, a stochastic matrix 116, a probability threshold 118, and a mitigation action 120.

The anomaly detection application 100 can be a stand-alone system (e.g., a physical computer system, virtually-provisioned computer functionality, etc.) that is capable of receiving log files from another computer, server, or other hardware resource via a physical or wireless network. In these embodiments, the anomaly detection application 100 can include physical or virtually-provisioned hardware components such as, but not limited to, one or more computer-readable storage media, one or more processors, one or more network interfaces, one or more bus interfaces, one or more displays, and the like.

In other embodiments, the anomaly detection application 100 can be downloaded to a host system from a remote data processing system. In such embodiments, the anomaly detection application 100 can be configured to interface with the host system to collect, compile, or otherwise receive log files and detect anomalies within those log files. In these embodiments, anomaly detection application 100 can comprise program instructions that are stored on one or more computer readable storage media for the host system and executable by one or more processors of the host system.

The log file 102 can be any raw log file such as, but not limited to, a system log file, a syslog log file, a transaction log file, a message log file, an event log file, an application log file, a server log file, or another type of log file. In some embodiments, the log file 102 is stored in a predetermined log format such as the Common Log Format (e.g., National Center for Supercomputing Applications (NCSA) Common Log Format), the Combined Log Format, or another log format. In some embodiments, the log file 102 includes information such as, but not limited to, timestamps, process identifiers, hostnames, Internet Protocol (IP) addresses, facility codes, messages, and the like.

The log file 102 can be segmented into a plurality of log entries 104. For example, the log file 102 can be parsed into the plurality of log entries 104 by a parser using respective timestamps in the log file 102 for identifying separate log entries 104.

The dictionary of terms 106 can include a set of unique terms appearing in the plurality of log entries 104. The dictionary of terms 106 can be generated by compiling unique terms from the plurality of log entries 104 (or the log file 102) and performing various Natural Language Processing (NLP) algorithms to reduce the cardinality (e.g., the number of terms) of the dictionary of terms 106. For example, stop words can be removed (e.g., words such as "of," "a,", and/or "the"). As another example, a stemmer algorithm can be used to convert inflected or derived words to their etymological root form in order to reduce duplication of words having a similar semantic meaning despite different syntactic forms. As another example, synonyms can be identified and merged.

The bag-of-words matrix 108 can be generated by creating a respective vector for respective log entries 104, where each vector in the bag-of-words matrix 108 can indicate a count of respective terms in the dictionary of terms 106 for each respective log entry 104. Thus, the bag-of-words matrix 108 can include rows and columns, where respective rows correspond to respective log entries of the plurality of log entries 104, and where respective columns correspond to respective terms of the dictionary of terms 106.

Cosine similarities 110 can be determined for consecutive log entries 104 in the bag-of-words matrix 108. Cosine similarities 110 can be representative of a cosine of an angle formed between two non-zero vectors. Thus, identical (e.g., parallel) vectors can have a cosine similarity equal to 1, whereas orthogonal vectors can have a cosine similarity equal to 0 and opposite vectors can have a cosine similarity equal to −1. Cosine similarities 110 can be useful for quantifying similarity in high-dimensional spaces where quantification of orientation is more important than quantification of magnitude. Such is the case in detecting anomalous log entries where tens, hundreds, or thousands of unique terms can be identified in the dictionary of terms 106 (in other words, a high dimensional space) and where the type of terms between consecutive log entries 104 (in other words, the orientation of respective vectors) provides more useful information than the number of terms between consecutive log entries 104 (in other words, the magnitude of respective vectors). Accordingly, cosine similarity is an advantageous metric for quantifying similarities between consecutive log entries 104.

Nonetheless, alternatives to cosine similarity exist and are within the spirit and scope of the present disclosure. For example, the Tanimoto coefficient, the Ostuka-Ochiai coefficient, the soft cosine measure (e.g., a cosine measure accommodating semantically similar words in NLP), the Sorensen-Dice coefficient, the Hamming distance, the Jaccard Index, and other quantitative measures of similarity between two vectors can be substituted in place of the cosine similarity discussed above.

The cosine similarities 110 can be converted to states 112, and the states 112 can be used to characterize state transitions 114 between consecutive log entries 104 (e.g., transitions from a first state based on a first cosine similarity of a first log entry to a second state based on a second cosine similarity of a second log entry). A stochastic matrix 116 can be generated by populating the stochastic matrix 116 with respective counts of respective state transitions 114. The stochastic matrix 116 can have as rows a previous state and as columns a subsequent state (or vice versa), and each element in the stochastic matrix 116 can correspond to a count of observed occurrences of respective state transitions 114.

Although the stochastic matrix 116 is discussed above, other matrices are within the spirit and scope of the present disclosure. For example, a Markov transition state matrix, a probability matrix, a transition matrix, a substitution matrix, or another matrix useful for characterizing state transitions are also within the spirit and scope of the present disclosure.

Probability threshold 118 can be used to differentiate anomalous log entries from non-anomalous log entries. For example, for an observed state transition (e.g., one of the state transitions 114), aspects of the present disclosure can retrieve a corresponding probability of the observed state transition from the stochastic matrix 116 in order to determine if the probability of the observed state transition is above or below the probability threshold 118. An observed state transition associated with a probability above the probability threshold 118 can be characterized as non-anomalous, whereas an observed state transition associated with a probability below the probability threshold 118 can be characterized as anomalous. The probability threshold 118 can be, for example, less than 5% (e.g., 0.05), less than 1% (e.g., 0.01), between 0.01% (e.g., 0.0001) and 0.5% (e.g., 0.005), or another number.

In some embodiments, a mitigation action 120 can be implemented for any detected anomaly. Mitigation action 120 can include, but is not limited to, a notification, a process, a command, and so on. When the mitigation action 120 is a notification, the notification can include information related to the anomaly, and the anomaly detection application 100 can transmit the notification to another computer system (not shown) via a network (not shown). When the mitigation action 120 is a process, the process can be executed to isolate, alter, or shut down another computer system (not shown) or isolate, alter, or shut down an application (not shown) executing on another computer system (not shown).

Figure 2:
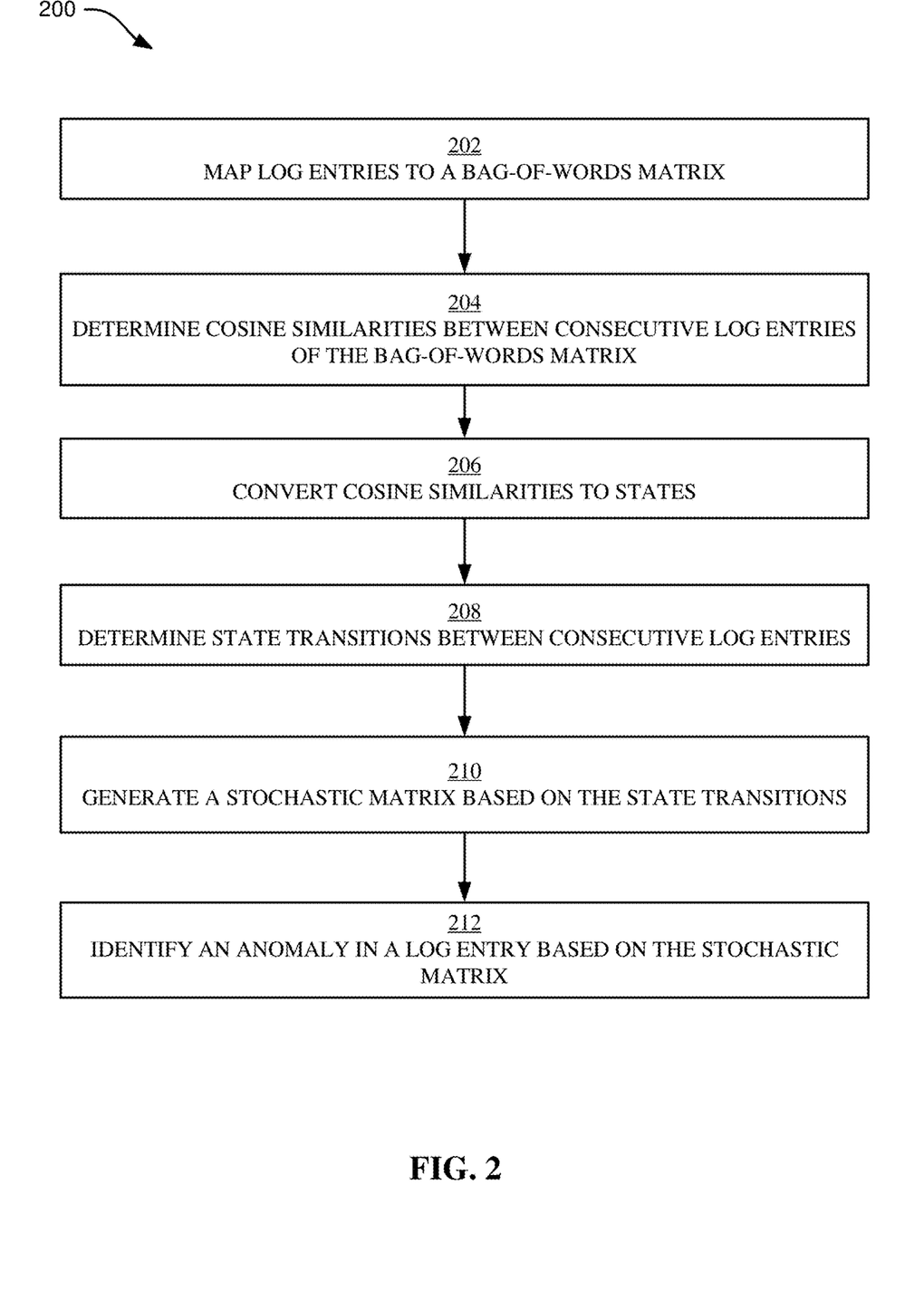
FIG. 2 illustrates a flowchart of an example method for identifying anomalies in log files, in accordance with embodiments of the present disclosure.

Referring now to FIG. 2, illustrated is a flowchart of an example method 200 for identifying anomalies in log files, in accordance with embodiments of the present disclosure. The method 200 can be implemented by, for example, an anomaly detection application 100, a computer, a processor, or another combination of hardware and/or software.

Operation 202 includes mapping log entries 104 to a bag-of-words matrix 108. In some embodiments, operation 202 includes generating log entries 104 from a log file 102 (e.g., by parsing the log file 102 by timestamps). In some embodiments, operation 202 includes populating the bag-of-words matrix 108 with a count of each term from dictionary of terms 106 that appears in each log entry 104.

For example, a log file 102 can be made up of m log entries 104 (e.g., $\mathcal{L} = \{\ell_1, \ldots \ell_i, \ldots \ell_m\}$). Likewise, the dictionary of terms 106 can made up of n terms (e.g., $\mathcal{W} = \{w_1, \ldots w_j, \ldots w_n\}$). The bag-of-words matrix 108 can be compiled by creating a vector for each log entry 104 indicating a frequency of each term from the dictionary of terms 106 appearing in each log entry 104. Thus, a bag-of-words matrix 108 can be generalized according to Equation (1):

$$M_{m \times n} = \begin{matrix} f_{11} & f_{1j} & f_{1n} \\ f_{i1} & f_{ij} & f_{in} \\ f_{m1} & f_{mj} & f_{mn} \end{matrix} \qquad \text{Equation (1)}$$

As shown in Equation (1), the bag-of-words matrix 108 can include respective log entries 104 in respective rows of the bag-of-words matrix 108 and respective terms of dictionary of terms 106 in respective columns of the bag-of-words matrix 108. Accordingly, $f_{11}$ can represent a count of the number of appearances of a first term from the dictionary of terms 106 in a first log entry of the plurality of log entries 104. As shown in Equation (1), there can be n terms in the dictionary of terms 106 and m log entries in the plurality of log entries 104. The variables n and m can be any integer and may span a variety of magnitudes such as tens, hundreds, thousands, or even millions. The subscripts i and j are representative of any number of terms or log entries separating the first term or first log entry from the $n^{th}$ term or $m^{th}$ log entry. Operation 202 is discussed in more detail hereinafter with respect to FIG. 3.

Operation 204 includes determining cosine similarities 110 between consecutive log entries 104 of the bag-of-words matrix 108. Operation 204 can include generating a list of cosine similarities 110 (e.g., $\mathcal{D}_{m-1} = \{d_1, \ldots d_i, \ldots d_m\} = \{\alpha_{v_1, v_2}, \ldots \alpha_{v_i, v_{i+1}}, \ldots \alpha_{v_{m-1}, m}\}$), where the list of cosine similarities 110 can include a number of entries that is one less than the plurality of log entries 104. In other words, a cosine similarity 110 can be associated with each log entry 104 beginning with a second log entry (because an initial log entry cannot have a cosine similarity 110 insofar as there is no previous log entry against which to compare the initial log entry).

For example, operation 204 can determine cosine similarities 110 according to Equation (2):

$$d_i = \alpha_{v_i, v_{i+1}} = \frac{\vec{v_i} \cdot \vec{v_{i+1}}}{|\vec{v_i}| \cdot |\vec{v_{i+1}}|} = \frac{\sum v_i \cdot v_{i+1}}{\sqrt{\sum v_i^2} \cdot \sqrt{\sum v_{i+1}^2}} \qquad \text{Equation (2)}$$

Equation (2) can thus determine the dot product of two vectors corresponding to consecutive log entries 104 in the bag-of-words matrix 108 and divide the dot product by the product of the magnitude of each of the two vectors. As is understood by one skilled in the art, the cosine similarities can be within the range of [−1, 1] inclusive, where −1 can represent opposite vectors, 1 can represent identical vectors, and 0 can represent orthogonal vectors.

Operation 206 includes converting the cosine similarities 110 to states 112 (e.g., Markov Chain states). In some embodiments, operation 206 can convert a cosine similarity 110 to a state 112, denoted as s, according to Equation (3):

$$s = \left\lceil \frac{d_i + 1}{\Delta d} \right\rceil \quad \text{Equation (3)}$$

In Equation (3), $\Delta d$ can be a parameter utilized to discretize the range of possible state values. In other words, selection of $\Delta d$ can determine the granularity of states and total number of states in the model. For example, $\Delta d$ can be 0.005, and the number of states can range from $$S \in \left\{ \left\lceil \frac{-1+1}{\Delta d} \right\rceil, \ldots, \left\lceil \frac{1+1}{\Delta d} \right\rceil \right\}$$

where each quotient can be rounded to a nearest whole number, a lower whole number (e.g., down-rounding), or a higher whole number (e.g., up-rounding), in accordance with various embodiments of the present disclosure. The term $d_i$ can refer to any respective cosine similarity 110. Thus, Equation (3) can be used to convert a cosine similarity 110 into a state 112.

Operation 208 includes determining state transitions 114 between consecutive log entries 104. A state transition 114 can indicate a first state (e.g., an initial state, a previous state, etc.) and a second state (e.g., a next state, a subsequent state, etc.). For example, a state transition 114 can be denoted $t_{kl}$ where t can be an identifier of a respective log entry 104, k can be an identifier of a previous state (e.g., the state associated with the log entry t–1), and l can be an identifier of a current state (e.g., the state associated with the log entry t). Thus, the number of state transitions 114 can be two fewer than the number of log entries 104 (e.g., m–2) insofar as an initial log entry cannot have a cosine similarity 110 (as previously discussed) and thus cannot have a state 112. Since a previous state is necessary to define a respective stat transition 114, a third log entry of a plurality of log entries 104 is the first log entry that can be associated with a state transition 114.

Operation 210 includes generating a stochastic matrix 116 based on the state transitions 114. The stochastic matrix 116 can be used to represent the probability of each of the state transitions 114. For example, a stochastic matrix 116 can be defined according to Equation (4):

$$S_{sxs} = \begin{matrix} s_{11} & s_{1l} & s_{1s} \\ s_{k1} & s_{kl} & s_{ks} \\ s_{s1} & s_{sl} & s_{ss} \end{matrix} \quad \text{Equation (4)}$$

As shown in Equation (4), each element in the stochastic matrix 116 can represent a number of occurrences of the corresponding state transition 114. The rows can represent a previous state whereas the columns can represent a subsequent state, next state, or current state. For example, $s_{11}$ can represent a number of times that two consecutive states 112 remained in state 1. As another example $s_{kl}$ can represent a number of times that consecutive states 112 resulted in a state transition 114 from state k (the previous state in the row position) to state l (the subsequent or current state in the column position).

The stochastic matrix 116 can be used to determined probabilities for various state transitions 114. For example, the probability for a given state transition 114 can be calculated according to Equation (5):

$$P_{kl} = \frac{s_{kl}}{\sum_{l=1}^{s} s_k} \quad \text{Equation (5)}$$

Equation (5) includes dividing a number of occurrences of a certain state transition (e.g., $s_{kl}$) by the sum of all occurrences of all state transitions in the same row (e.g., $\Sigma_{l=1}^{s} S_k$). The same row is used to represent all possible future states from the same previous state.

Operation 212 includes identifying an anomalous log entry based on the stochastic matrix 116. Operation 212 can include comparing a probability (e.g., derived from the stochastic matrix 116) for a respective state transition 114 between consecutive log entries (e.g., a previous log entry to the anomalous log entry) to a probability threshold 118. In the event that the probability is below the probability threshold 118 (e.g., is unlikely to occur during normal operations), operation 212 can characterize the corresponding log entry as the anomalous log entry. In the event that the probability is above the probability threshold 118 (e.g., reasonably likely to occur during normal operations), operation 212 can characterize the corresponding log entry as a non-anomalous log entry. In some embodiments, operation 212 includes implementing a mitigation action 120 for any detected anomalous log entries. Operation 212 is discussed in more detail hereinafter with respect to FIG. 4.

Figure 3:
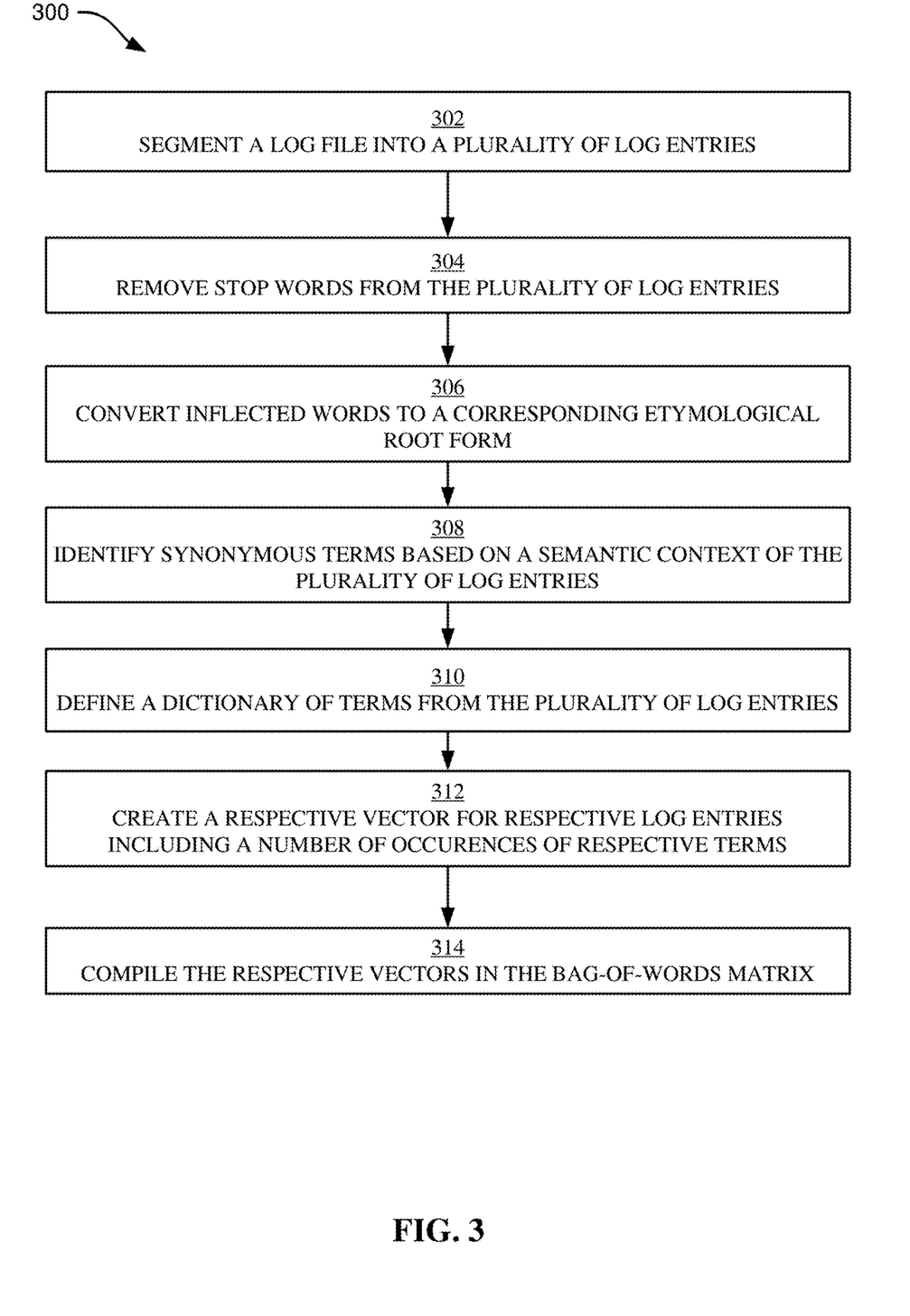
FIG. 3 illustrates a flowchart of an example method for generating a bag-of-words matrix from a log file, in accordance with some embodiments of the present disclosure.

Referring now to FIG. 3, illustrated is a flowchart of an example method 300 for generating a bag-of-words matrix 108 from a log file 102, in accordance with some embodiments of the present disclosure. The method 300 can be implemented by, for example, an anomaly detection application 100, a computer, a processor, or another combination of hardware and/or software. In some embodiments, the method 300 is a sub-method of operation 202 of FIG. 2.

Operation 302 includes segmenting the log file 102 into a plurality of log entries 104. The plurality of log entries 104 can be parsed according to a timestamp associated with each of the plurality of log entries 104.

Operation 304 includes removing stop words from the plurality of log entries 104. Stop words can be words which contribute little or no semantic value to the text for NLP purposes. Some example stop words are "the," "is," "at," "which," and "on," among others. Thus, operation 304 can be advantageous in reducing the number of terms in the dictionary of terms 106, thereby reducing the amount of processing power required to identify anomalies in respective log entries 104. Reducing the number of terms can also increase the accuracy of the anomaly identification by removing terms of limited or no value but which may otherwise increase the likelihood of generating a false positive (e.g., due to meaningless differences in stop words overriding similarities or expected differences in other terms) or increase the likelihood of generating a false negative (e.g., due to similarities in stop words overriding meaningful differences in other terms).

Operation 306 includes converting inflected words to a corresponding etymological root form. For example, words that are inflected insofar as they are plural, reflexive, progressive tense, past tense, comparative, superlative, or another inflected version of a base word can be converted to their etymological root form. Operation 306 can thus be advantageous for the purpose of reducing the number of terms in the dictionary of terms 106. This is beneficial to increasing efficiency and/or accuracy as discussed above with respect to operation 304.

Operation 308 includes identifying synonymous terms based on a semantic context of the plurality of log entries 104. Operation 308 can include merging identified synonyms so that the synonyms are represented by a single term in the dictionary of terms 106 rather than multiple terms. Similar to the above, identifying synonyms serves to reduce the number of redundant terms in dictionary of terms 106. This is beneficial to increasing efficiency and/or accuracy as discussed above with respect to operation 304.

Operation 310 includes defining a dictionary of terms 106 based on the remaining terms that were not removed or modified in any of operations 304-308. It should be noted that the dictionary of terms 106 can include terms that are words, phrases, expressions, codes (e.g., alphabetical codes, numeric codes, alphanumeric codes, etc.), and/or other compositions of words, numbers, and/or symbols.

Operation 312 includes creating respective vectors for respective log entries 104 by counting a number of occurrences of each of the terms in the dictionary of terms 106 in the given log entry 104. Operation 314 includes compiling the respective vectors generated in operation 312 into the bag-of-words matrix 108. In other words, operation 314 includes adding each respective vector generated in operation 312 into the bag-of-words matrix 108, where the vectors can be added to the bag-of-words matrix 108 in ascending order (e.g., a first vector corresponding to a first log entry in a first row of the bag-of-words matrix 108, a second vector corresponding to a second log entry in a second row of the bag-of-words matrix 108, and so on).

Figure 4:
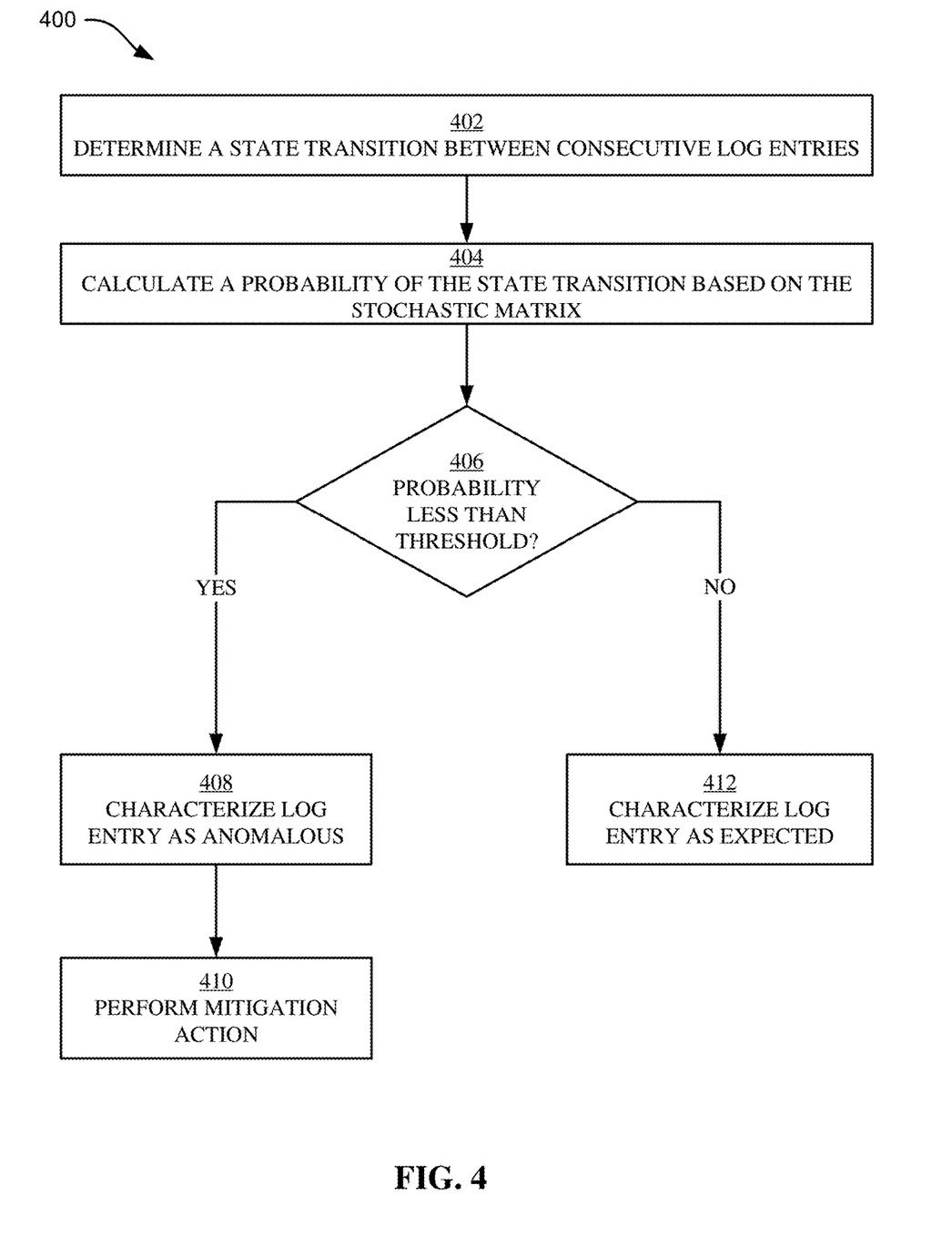
FIG. 4 illustrates a flowchart of an example method for identifying an anomaly in a log file based on a stochastic matrix, in accordance with some embodiments of the present disclosure.

Referring now to FIG. 4, illustrated is a flowchart of an example method 400 for identifying an anomaly in a log file 102 based on a stochastic matrix 116, in accordance with some embodiments of the present disclosure. The method 400 can be implemented by, for example, an anomaly detection application 100, a computer, a processor, or another combination of hardware and/or software. In some embodiments, the method 400 is a sub-method of operation 212 of FIG. 2.

Operation 402 includes determining a state transition between consecutive log entries (e.g., these can be log entries from log entries 104 of log file 102 or newly received log entries from a new log file, where the new log file is similar to the log file 102 such as from a same server, a same application, a same client, etc.). Operation 402 can use Equation (3) to determine respective states 112 for respective cosine similarities 110.

For example, operation 402 can determine a state transition between a first log entry and a second log entry by calculating a first cosine similarity based on a first vector of the first log entry compared to a previous vector of a previous log entry and calculating a second cosine similarity based on a second vector of the second log entry compared to the first vector of the first log entry. Operation 402 can subsequently convert the first cosine similarity to a first state and convert the second cosine similarity to a second state. The state transition for the second log entry can thus be characterized as the first state (e.g., associated with the first log entry) and the second state (e.g., associated with the second log entry).

Operation 404 includes calculating a probability for the state transition between consecutive log entries determined in operation 402 using the stochastic matrix 116. For example, the probability can be determined using Equation (5). Continuing the above example, operation 404 can retrieve the probability for the state transition associated with the second log entry by retrieving a count of observances of the state transition from the stochastic matrix 116 by querying an element of the stochastic matrix 116 having a row equal to the first state and a column equal to the second state. The probability can then be determined by dividing the retrieved count of observances of the state transition associated with the second log entry by a sum of all observances in the row of the stochastic matrix 116 corresponding to the first state.

Operation 406 includes determining if the probability of the state transition is less than a probability threshold 118. The probability threshold 118 can be user defined or automatically defined (e.g., determined using machine learning or statistics techniques). If the probability of the state transition is less than the probability threshold 118 (406: YES), then the method 400 proceeds to operation 408 and characterizes the observed log entry as an anomalous log entry. Continuing the above example, the second log entry can be characterized as an anomalous log entry.

In some embodiments, the method 400 then proceeds to operation 410 and performs a mitigation action 120. The mitigation action 120 can be, but is not limited to, generating a notification, transmitting a notification, ending a process, closing an application, isolating a node (e.g., isolating network communication to a hardware asset or a virtually provisioned asset), and the like.

Referring back to operation 406, in the event that the probability of the observed state transition is not less than the probability threshold 118 (i.e., is greater than the threshold) (406: NO), then the method 400 proceeds to operation 412 and characterizes the observed log entry as a non-anomalous (e.g., an expected) log entry.

Figure 5A:
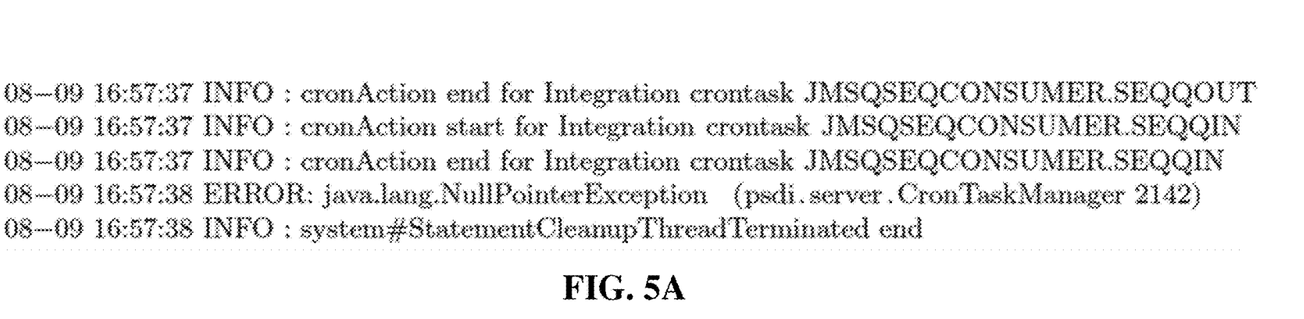
FIG. 5A illustrates an example plurality of log entries, in accordance with some embodiments of the present disclosure.

Referring now to FIG. 5A, illustrated is an example plurality of log entries 104, in accordance with some embodiments of the present disclosure. As shown in FIG. 5A, the plurality of log entries 104 can include a timestamp, a classification (e.g., INFO, ERROR, etc.), and other information.

Figure 5B:
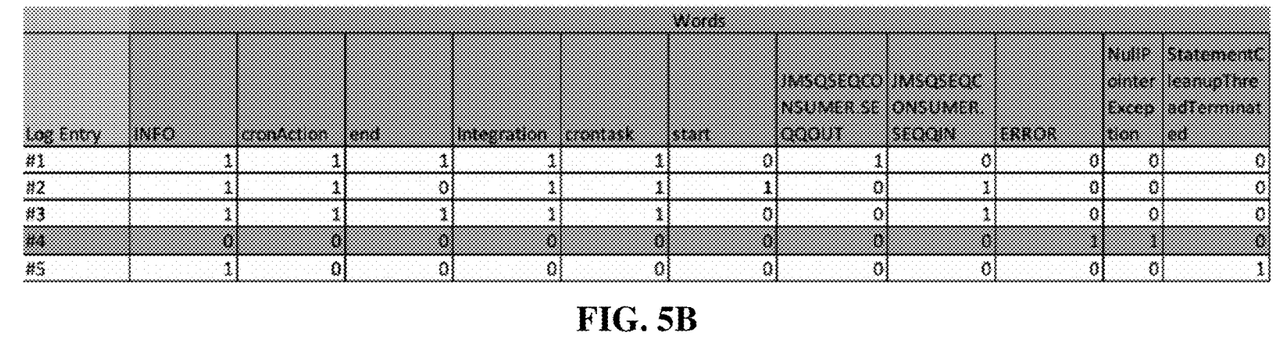
FIG. 5B illustrates an example bag-of-words matrix, in accordance with some embodiments of the present disclosure.

Referring now to FIG. 5B, illustrated is an example bag-of-words matrix 108, in accordance with some embodiments of the present disclosure. As shown in FIG. 5B, each of the five log entries 104 illustrated in FIG. 5A are included in a respective row of the bag-of-words matrix 108. Furthermore, the bag-of-words matrix 108 includes a count of each of the terms appearing in each of the log entries 104. As shown in FIG. 5B, the "words" column headings can correspond to respective terms in the dictionary of terms 106.

Figure 5C:
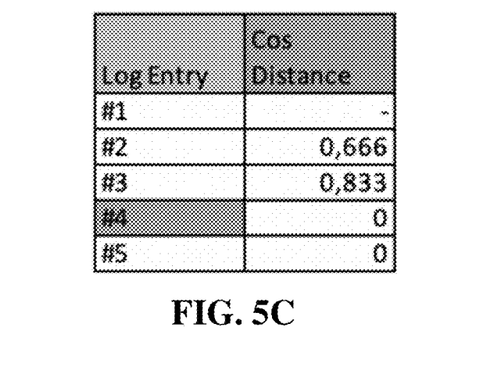
FIG. 5C illustrates example cosine similarities, in accordance with some embodiments of the present disclosure.

Referring now to FIG. 5C, illustrated are example cosine similarities 110, in accordance with some embodiments of the present disclosure. As shown in FIG. 5C, the cosine similarity 110 between log entry 1 and log entry 2 is shown as 0.666. Likewise, the cosine similarity 110 between log entry 3 and log entry 2 is shown as 0.833. Likewise, the cosine similarity between log entry 4 and log entry 3 is shown as 0. Finally, the cosine similarity between log entry 5 and log entry 4 is shown as 0. Furthermore, as shown, log entry 1 has no cosine similarity 110 because there is no previous log entry against which to compare log entry 1.

As shown in FIGS. 5A-5C, log entry 4 is identified as an anomalous log entry. As shown in FIG. 5C, the cosine similarity 110 associated with log entry 3 (0.833) can correspond to a first state and the cosine similarity 110 associated with log entry 4 (0) can correspond to a second state. Although not shown in FIGS. 5A-5C, a stochastic matrix 116 generated according to historical state transitions would indicate that a state transition between the first state and the second state would have a probability below a probability threshold 118, thereby rendering log entry 4 an anomalous log entry.

Figure 6:
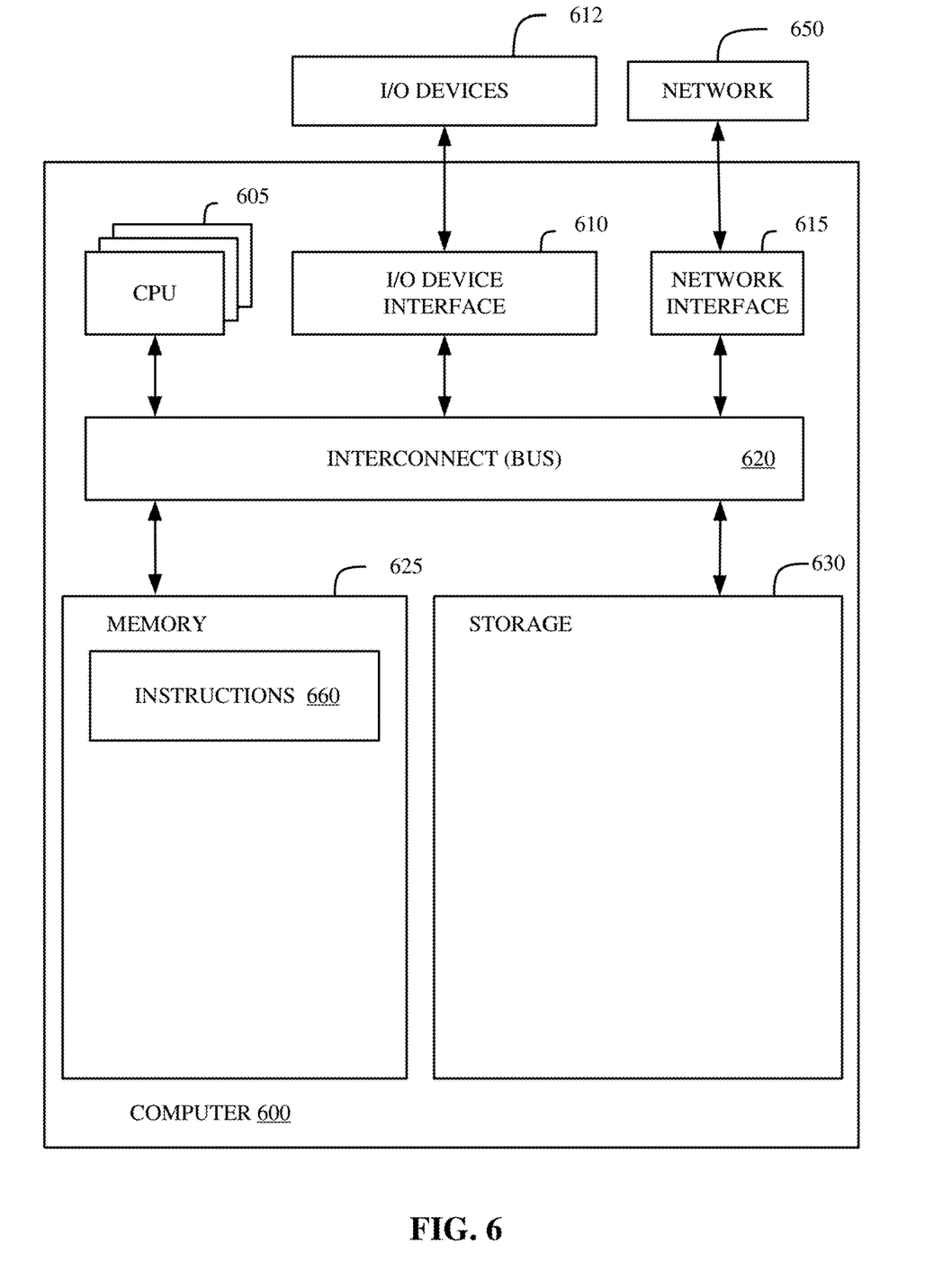
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform the methods described in any one or more of FIGS. 2-4 and/or implement the functionality discussed in any one of FIGS. 1 and/or 5A-5C. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine such that the client machine executes the method, or a portion of the method, based on the instructions provided by computer 600. In some embodiments, the computer 600 is incorporated into (or functionality similar to computer 600 is virtually provisioned to) the anomaly detection application 100, or another aspect of the present disclosure.

Computer 600 includes memory 625, storage 630, interconnect 620 (e.g., BUS), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more busses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, any of the methods of FIGS. 2-4 and/or implement the functionality discussed in any one of FIGS. 1 and/or 5A-5C. In some embodiments, instructions 660 can be referred to as anomaly detection instructions, anomaly detection functionality, or an anomaly detection protocol. Although instructions 660 are shown in memory 625, instructions 660 can include program instructions collectively stored across numerous computer-readable storage media and executable by one or more CPUs 605.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
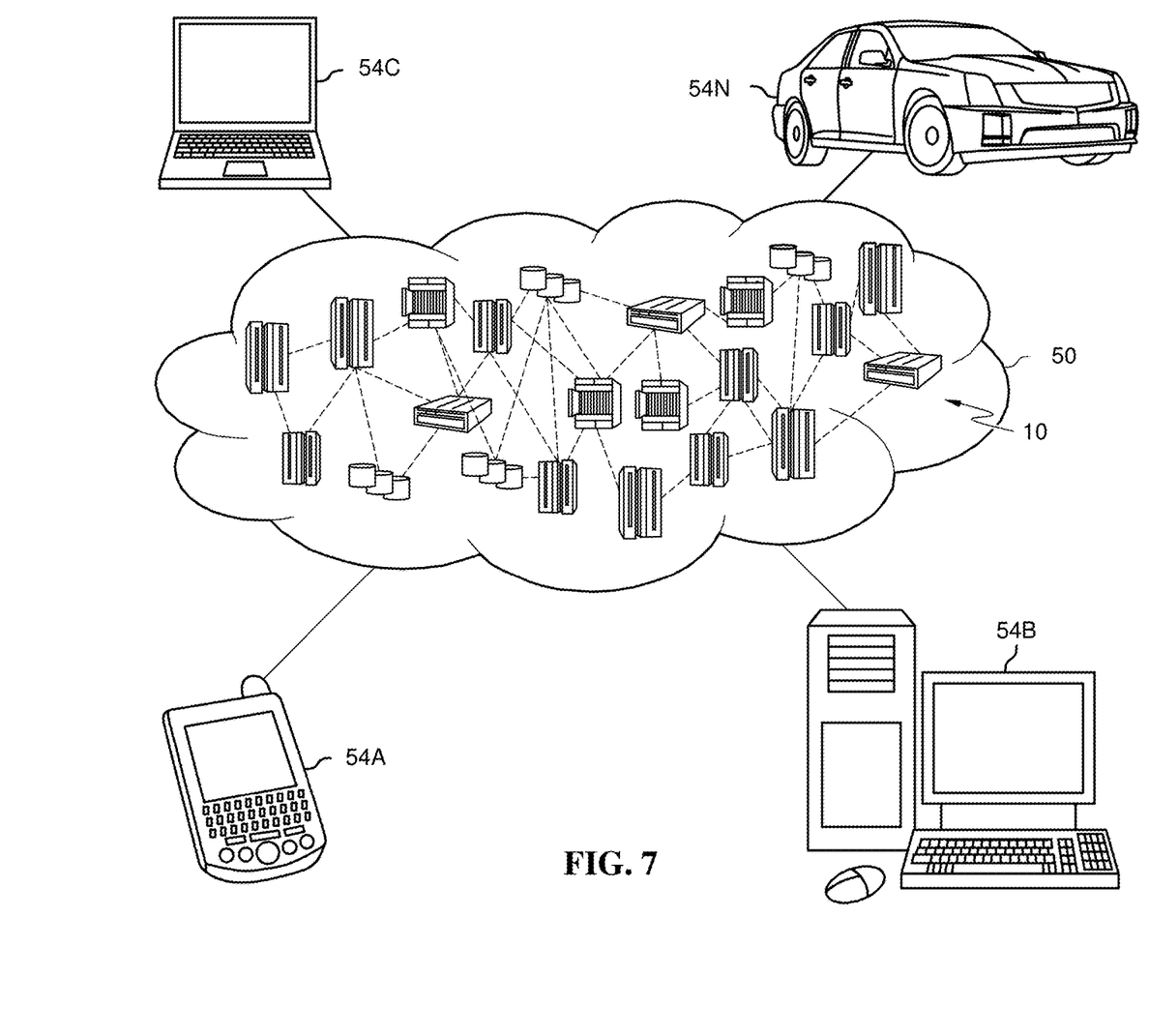
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
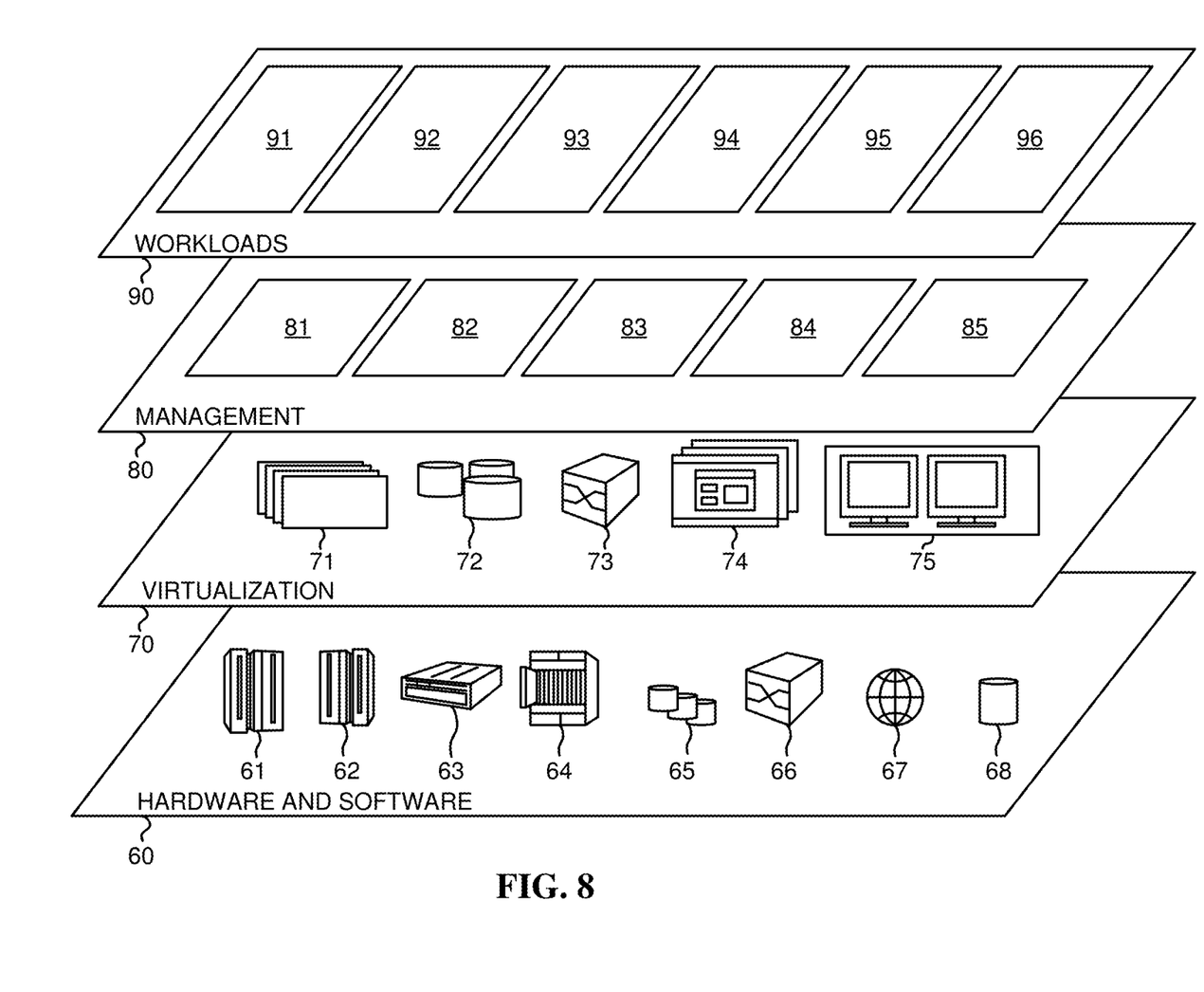
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection in log files 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any subset of the methods described with respect to FIGS. 2-4 and/or implement the functionality discussed in any one of FIGS. 1 and/or 5A-5C) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:
    mapping a plurality of log entries into a bag-of-words matrix;
    determining respective cosine similarities between consecutive log entries in the bag-of-words matrix;
    converting the respective cosine similarities to respective states;
    determining respective state transitions between the consecutive log entries;
    generating a stochastic matrix based on the respective state transitions; and
    identifying an anomalous log entry based on an anomalous state transition that has a probability below a probability threshold, wherein the probability is based on the stochastic matrix.

2. The method of claim 1, wherein the plurality of log entries are derived from a log file, and wherein the method further comprises:
    segmenting, by a parser, the log file into the plurality of log entries, wherein the log file is segmented based on timestamp information associated with the plurality of log entries.

3. The method of claim 1, wherein mapping the plurality of log entries into the bag-of-words matrix further comprises:
    defining a dictionary of terms from the plurality of log entries;
    creating a first vector for a first log entry, the first vector comprising a respective count of each respective term in the first log entry; and
    adding the first vector to the bag-of-words matrix.

4. The method of claim 3, wherein defining the dictionary of terms further comprises:
    removing stop words from the plurality of log entries;
    converting inflected words to a corresponding etymological root form; and
    merging synonymous terms based on a semantic context of the plurality of log entries.

5. The method of claim 1, wherein identifying the anomalous log entry further comprises:
    calculating the probability of the anomalous state transition by dividing an element in a given row in the stochastic matrix corresponding to the anomalous state transition by a sum of elements in the given row; and
    determining that the probability is less than the probability threshold.

6. The method of claim 1, wherein the stochastic matrix comprises a respective number of occurrences for the respective state transitions.

7. The method of claim 1, wherein the method is performed by a host system according to software that is downloaded to the host system from a remote data processing system.

8. The method of claim 7, wherein the method further comprises:
metering a usage of the software; and
generating an invoice based on metering the usage.

9. A system comprising:
one or more processors; and
one or more computer-readable storage media collectively storing program instructions which, when executed by the one or more processors, are configured to cause the one or more processors to perform a method comprising:
mapping a plurality of log entries into a bag-of-words matrix;
determining respective cosine similarities between consecutive log entries in the bag-of-words matrix;
converting the respective cosine similarities to respective states;
determining respective state transitions between the consecutive log entries;
generating a stochastic matrix based on the respective state transitions; and
identifying an anomalous log entry based on an anomalous state transition that has a probability below a probability threshold, wherein the probability is based on the stochastic matrix.

10. The system of claim 9, wherein the plurality of log entries are derived from a log file, and wherein the method further comprises:
segmenting, by a parser, the log file into the plurality of log entries, wherein the log file is segmented based on timestamp information associated with the plurality of log entries.

11. The system of claim 9, wherein mapping the plurality of log entries into the bag-of-words matrix further comprises:
defining a dictionary of terms from the plurality of log entries;
creating a first vector for a first log entry, the first vector comprising a respective count of each respective term in the first log entry; and
adding the first vector to the bag-of-words matrix.

12. The system of claim 11, wherein defining the dictionary of terms further comprises:
removing stop words from the plurality of log entries;
converting inflected words to a corresponding etymological root form; and
merging synonymous terms based on a semantic context of the plurality of log entries.

13. The system of claim 9, wherein identifying the anomalous log entry further comprises:
calculating the probability of the anomalous state transition by dividing an element in a given row in the stochastic matrix corresponding to the anomalous state transition by a sum of elements in the given row; and
determining that the probability is less than the probability threshold.

14. The system of claim 9, wherein the stochastic matrix comprises a respective number of occurrences for the respective state transitions.

15. A computer program product comprising one or more computer readable storage media, and program instructions collectively stored on the one or more computer readable storage media, the program instructions comprising instructions configured to cause one or more processors to perform a method comprising:
mapping a plurality of log entries into a bag-of-words matrix;
determining respective cosine similarities between consecutive log entries in the bag-of-words matrix;
converting the respective cosine similarities to respective states;
determining respective state transitions between the consecutive log entries;
generating a stochastic matrix based on the respective state transitions; and
identifying an anomalous log entry based on an anomalous state transition that has a probability below a probability threshold, wherein the probability is based on the stochastic matrix.

16. The computer program product of claim 15, wherein the plurality of log entries are derived from a log file, and wherein the method further comprises:
segmenting, by a parser, the log file into the plurality of log entries, wherein the log file is segmented based on timestamp information associated with the plurality of log entries.

17. The computer program product of claim 15, wherein mapping the plurality of log entries into the bag-of-words matrix further comprises:
defining a dictionary of terms from the plurality of log entries;
creating a first vector for a first log entry, the first vector comprising a respective count of each respective term in the first log entry; and
adding the first vector to the bag-of-words matrix.

18. The computer program product of claim 17, wherein defining the dictionary of terms further comprises:
removing stop words from the plurality of log entries;
converting inflected words to a corresponding etymological root form; and
merging synonymous terms based on a semantic context of the plurality of log entries.

19. The computer program product of claim 15, wherein identifying the anomalous log entry further comprises:
calculating the probability of the anomalous state transition by dividing an element in a given row in the stochastic matrix corresponding to the anomalous state transition by a sum of elements in the given row; and
determining that the probability is less than the probability threshold.

20. The computer program product of claim 15, wherein the stochastic matrix comprises a respective number of occurrences for the respective state transitions.

* * * * *